UNITED STATES PATENT OFFICE.

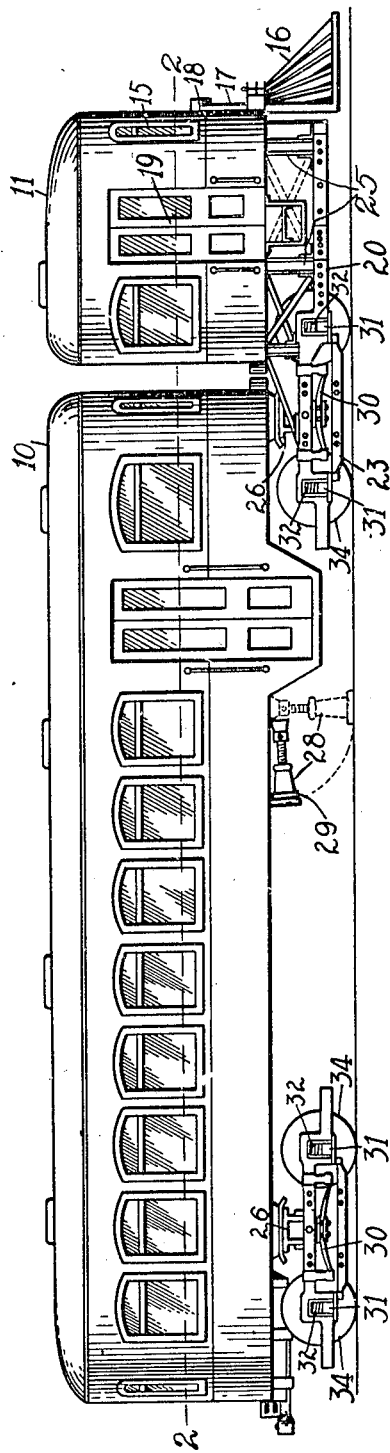

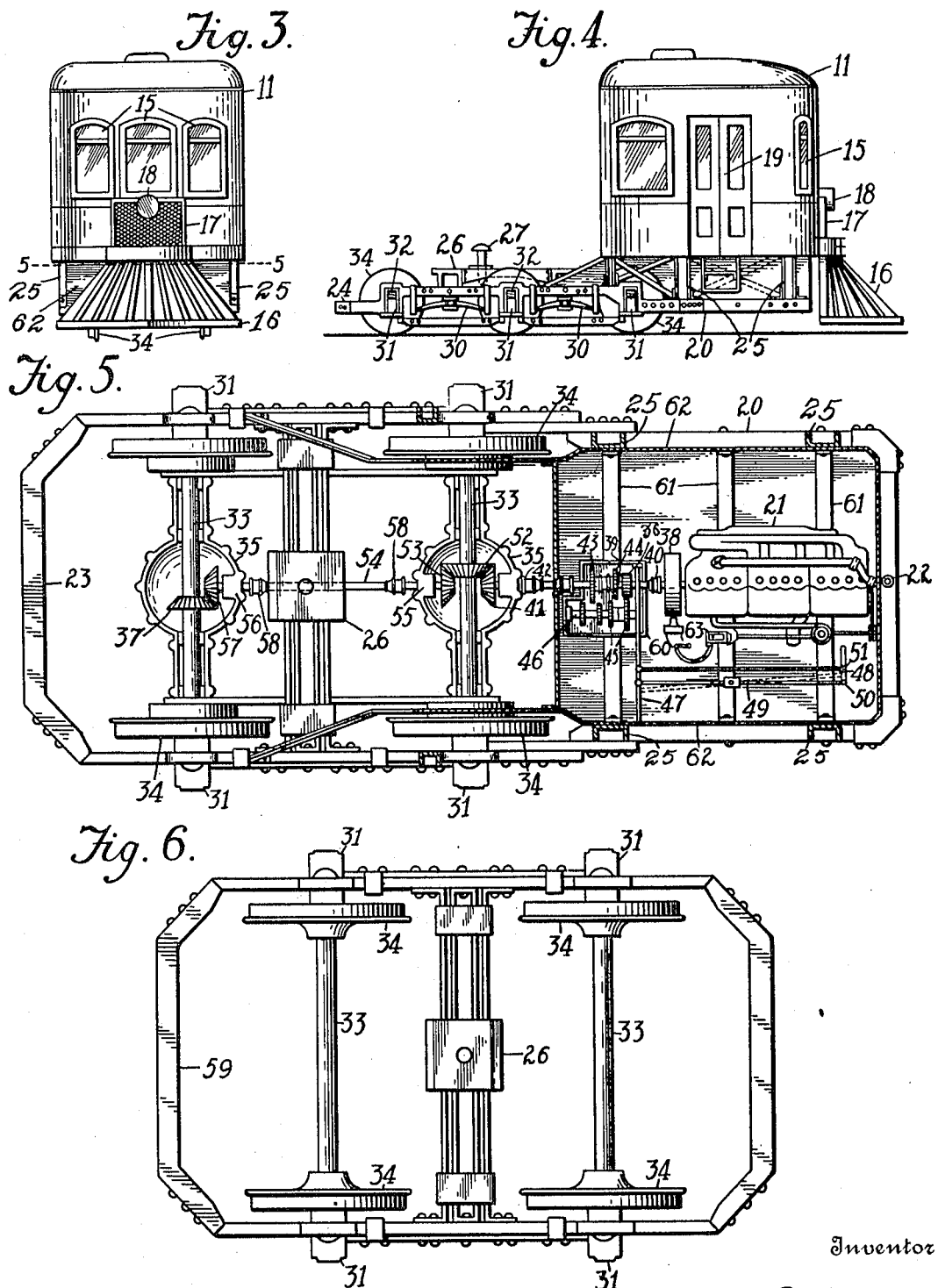

JOSEPH L. FRICK AND HARRY G. CLEMENGER, OF JAMESTOWN, NEW YORK.

TRACTION LOCOMOTIVE AND CAR.

1,298,194.  Specification of Letters Patent.  Patented Mar. 25, 1919.

Application filed September 26, 1918. Serial No. 255,809.

*To all whom it may concern:*

Be it known that we, JOSEPH L. FRICK and HARRY G. CLEMENGER, citizens of the United States, residing at the city of Jamestown, in the county of Chautauqua and State of New York, have invented certain new and useful Improvements in Traction Locomotives and Cars, of which the following, taken in connection with the accompanying drawings, is a specification.

The invention relates to interurban or traction cars and the arrangement of their power transmission and control, and is an improvement upon the construction shown in our Letters Patent No. 1,272,935, dated July 16, 1918: and the object of the improvement is to provide a locomotive for traction cars which may be driven on a railway track substantially the same as an automobile or motor on a roadway and draws a load, the driving mechanism being shown as for a gasolene engine, the light weight of said engine permitting the use of a rearwardly extending multiple wheel driving truck for supporting the forward end of the traction car and the cab of the locomotive, the rearwardly extending truck balancing the forwardly extending engine and cab: and the invention consists in the novel features and combinations hereinafter set forth and claimed.

In the drawings, Figure 1 is a side elevation of a traction car with our improved traction locomotive attached to the front of the same. Fig. 2 is a sectional view at line 2—2 in Fig. 1 showing a plan view of the interior of the locomotive cab and the traction car. Fig. 3 is a front elevation of the traction locomotive showing the radiator and headlight: and Fig. 4 is a side elevation of the same unattached to the traction car, the traction locomotive being shown with six drive wheels instead of four, as preferred for heavy loads and high grades. Fig. 5 is a sectional view at line 5—5 in Fig. 3 showing a plan view of the preferred arrangement of the engine and driving transmission to each of the axles of the trucks. Fig. 6 is a top plan view of the rear truck removed from beneath the car body.

Like characters of reference refer to corresponding parts in the several views.

The numeral 10 designates the body of the traction car which may be made in any desired design. The numeral 11 designates the body of the cab for the traction locomotive. The traction car body 10 and cab 11 are preferably made of metal so as to be as rigid and strong as possible as well as fireproof.

The car body 10 is preferably made with the end door 12 to connect to other cars and side entrance doors 13, the cab having a rear end door 14 admitting to the car end door 12, also front windows 15 for the motorneer. A fender or cow catcher 16 is provided on the front of the cab body 11. Said cab body 11 and car body 10 are each provided with a heavy bed frame to render said cab and car as rigid and steady riding as possible.

A radiator 17 is provided on the front of the cab 11, and a head lamp 18. The cab 11 is also preferably provided with double side doors 19 so that the rear portion of said cab may be used for express or baggage. The rear end of the cab body 11 and the front end of the car 10 are preferably curved so as to permit passage around the sharp curves common to traction lines as compared with steam railway lines.

The traction locomotive consists of the cab 11 which is supported upon a frame 20 by standards 25. The frame 20 also supports the power plant or motor 21 which is here shown as a gas engine and is connected to the radiator 17 by the pipe 22 in order to cool the water. A suitable steam engine might take the place of the gas engine 21. The frame 20 is supported upon the wheel truck, which is shown as a four wheel truck in Figs. 1 and 5 and as a six wheel truck 24 in Fig. 4, for the more powerful engine. The trucks 23 and 24 extend to the rear of the cab 11 nearly the whole truck portion thereby counterbalancing the motor plant 21 and the cab 11. Said trucks 23 and 24 have the platform or bolster 26 with the king bolt 27 so that they may be inserted and attached beneath the front end of the car body 10, suitable means being provided for the support of said car body 10 when the truck 23 or 24 is removed from beneath the same for use with other traction cars.

Said supporting means is preferably hinged to the underside of the car body 10, as for example a jack screw 28 which is hinged at its upper end to the under side of the car bed frame so as to fold against said bed frame and is held in the folded position by a strap 29 when not in use, and may be quickly and easily dropped. The jack screw 28 in its upright portion is used to raise the front portion of the car body 10 and the king bolt 27 from the supporting platform or bolster 26.

The frame 20 is made sufficiently strong to support the car bodies and hold everything in line. It is apparent therefore that the frame 20 must be sufficiently strong to hold either the four wheeled truck as shown in Figs. 1 and 5, or the six wheel truck as shown in side elevation in Fig. 4, supporting also the springs 30 and holding all the parts in perfect alinement. The trucks 23 and 24 are made with the boxes 31 for each end of each axle 33, being preferably provided with coil springs 32 to hold the boxes in bearing as is common on traction cars. Thus the forward axle 33 has the wheels 34 mounted on each end thereof in the boxes 31 and the rear axle 33 has the wheels 34 mounted thereon. Suitable casings 35 are provided for the axles 33 to protect said axles and the driving gears from dust and dirt, the central portion forming a grease container for the lubrication of said gears.

Immediately in the rear of the engine 21, a clutch 38 is mounted on the main shaft 39 which extends back from the engine 21 to the main shaft drive gear 36, said main shaft 39 having the universal joints 40 and 42 to render it flexible for curves and undulations. The main shaft 39 is supported in suitable bearings and has mounted thereon the low and reverse pinions 43 and 44. The low and reverse gears 45 are mounted on a counter shaft 46 parallel with the main shaft 39, which sliding gears 45 are controlled by means of a cross shaft 47 to which are attached the link rods 38 and 49 which connect to the gear shift lever 50 and the band-brake lever 51, which levers 50 and 51 extend up into the motorneer's cab 10. The main shaft 39 has the bevel gear 41 mounted on its rear end which meshes in a bevel gear 52 mounted on the forward axle 33 to turn said axle.

The axles 33 of the truck 23 are connected by a direct drive shaft 54 which has the bevel gear 53 on its forward end which meshes in the bevel gear 52, a suitable journal 55 being provided for said forward end of the shaft 54 in the forward grease box 35. The rear end of the shaft 54 is supported in a similar journal 56 in the rear grease box 35 and has the bevel gear 57 thereon which meshes in the bevel gear 37 on the rear axle 33 within the grease box 35. This provides a direct drive for the four wheel truck 23 through both the axles 33 of said truck. In the six wheel truck shown in side elevation in Fig. 4, the third axle 33 is driven in precisely the same manner as the rear axle 33 by a direct duplicate shaft 54 and bevel gears which connect the second and third axles 33 the same as the first and second are shown in Fig. 5. Universal joints 58 are provided on the shaft 54 to permit the adjustment of said propeller shaft 54 to the necessary changes caused by curves and undulations.

Suitable brakes are provided for the wheels 34 substantially as shown and described in our former Letters Patent of record. The rear truck 59 is not connected to the truck 23 or 24, merely acting as a trailer truck to support the rear end of the car 10. The four wheels 34 of the truck 59 with the jack screw 28 support the car 10 firmly in position on the track when the trucks 23 or 24 are removed from beneath the forward end of said car.

The transmission gearing 43, 44 and 45 is mounted in a suitable grease box 60. Said box and the engine 21 and clutch 38 are supported upon suitable cross bars 61 on the frame 20 within the sheet metal housing or casing 62 which shuts out all dust and dirt. A generator 63 is provided alongside the engine 21 within the housing 62 mounted on a suitable shaft and is connected by pulleys and belt to a suitable shaft upon which is mounted a fan, not shown, in the rear of the radiator 17, the fan construction and adjustment being much the same as is common in automobiles.

It is apparent that this arrangement of the motor with the simple direct drive to the forward truck provides a traction locomotive with any desired degree of power according to the size of the engine and the number of driving wheels on said forward truck, and that said locomotive may be controlled the same as an automobile by means of the gear and shift lever 50 and handbrake lever 51, suitable connections being provided for the brakes to foot levers within the cab 11 so that the motorneer controls and drives the traction locomotive the same as a chauffeur would drive an automobile. Any high powered locomotive may thus be easily arranged for having a plurality of driving wheels as for example six drive wheels as shown in Fig. 4, in which case the central drive wheels may be flangeless for crooked tracks having short curves, though on most tracks the flanged wheel may be used. The truck is weighted sufficiently to balance the cab 11 and motor 21, though the end of the car 10 will be attached upon the bolster 26 by the bolt 27 whenever said locomotive is drawing a load and the weight of said car will give added gripping power to the wheels on the rails.

We claim as new:—

1. In a motor driven vehicle the combination of a truck containing four or more driving wheels on axles rotatively mounted in a supporting frame, an endwise extension on said frame, and a cab and driving mechanism supported on said endwise extension of said frame so that no part of the cab projects rearwardly beyond the front wheels of the truck, said cab and driving mechanism counter-weighted by said truck.

2. A traction locomotive comprising a car truck having two or more pairs of wheels, a front extension on the frame of said car truck, a motorneer's cab supported on said front extension of said car truck frame, a power plant supported on said front extension of said truck frame beneath said cab, the major portion of said car truck extending rearwardly from said cab and power plant to provide a balanced support for the same.

3. A traction locomotive comprising a car truck having two or more pairs of wheels rotatively mounted in the truck frame, a front extension on said frame, a motorneer's cab supported over the front extension of said frame, a power plant supported on said front extension of said frame beneath said cab, and one end of a traction car removably supported on said car truck in advance of the rear truck wheels as it extends to the rear of said cab and power plant to balance the same and draw said car.

4. A traction locomotive comprising a multiple wheel truck, a frame for said truck having an extension forward of the wheel supported portion thereof, a motor and cab supported on said forward extension of said truck frame, said cab and motor balanced by said multiple wheel truck as it extends to the rear of the same, transmission gearing universally connecting said motor to the axles of said multiple wheel truck to drive the same, and means for attaching said truck beneath the end of a traction car to draw the same.

5. A motor driven vehicle comprising a truck having two or more pairs of wheels mounted on axles in a truck frame, an endwise extension on said truck frame, a cab and driving mechanism for said vehicle supported on said forward extension of said truck frame by the counter-weight of said truck, a gear fixed on each of said axles between its wheels, a casing inclosing each gear, a universally jointed shaft journaled in the casings and carrying terminal gears each in mesh with said gear fixed on each axle, a bolster between said axles through which said transmission passes, and said driving mechanism geared to operate one of said axles.

6. In a motor driven vehicle, a locomotive truck supported on front and rear wheels and having a frame extension forward of the wheel supported portion thereof, a bearing provided on the truck intermediate of the wheels, a trailer car having its forward end resting on and secured to the bearing, and a cab carried by the frame extension and arranged so that no part thereof projects rearwardly of the front wheels.

7. A locomotive truck having front and rear traction wheels, a motorneer's cab supported on the truck over and in advance of the front wheels whereby the body of the truck will be exposed for supporting the forward end portion of a trailer car, and means substantially central of the truck for supporting and securing the forward end of a trailer car thereto.

In testimony whereof we have affixed our signatures in the presence of two witnesses.

JOSEPH L. FRICK.
HARRY G. CLEMENGER.

Witnesses:
H. A. SANDBERG,
I. E. NORDSTROM.